United States Patent [19]

Tomlinson et al.

[11] Patent Number: 4,700,363

[45] Date of Patent: Oct. 13, 1987

[54] DATA COMMUNICATION METHOD AND APPARATUS

[75] Inventors: Martin Tomlinson, Totnes; Jonathan R. Bramwell, Ivybridge, both of England

[73] Assignee: Devon County Council, Exeter, England; a part interest

[21] Appl. No.: 840,575

[22] PCT Filed: Jun. 7, 1985

[86] PCT No.: PCT/GB85/00251

§ 371 Date: Feb. 10, 1986

§ 102(e) Date: Feb. 10, 1986

[87] PCT Pub. No.: WO86/00185

PCT Pub. Date: Jan. 3, 1986

[30] Foreign Application Priority Data

Jun. 9, 1984 [GB] United Kingdom ............... 8414759
Aug. 10, 1984 [GB] United Kingdom ............... 8420380

[51] Int. Cl.$^4$ ............................................. H04B 15/00
[52] U.S. Cl. ........................................ 375/37; 375/58; 371/43
[58] Field of Search ............... 375/37, 53, 67, 57, 375/58; 371/43, 44, 45; 370/18

[56] References Cited

U.S. PATENT DOCUMENTS

| | | | |
|---|---|---|---|
| 3,909,721 | 9/1975 | Bussgang et al. | 375/53 |
| 4,035,767 | 7/1977 | Chen et al. | 371/43 |
| 4,077,021 | 2/1978 | Csajka et al. | 375/67 |
| 4,211,996 | 7/1980 | Nakamura | 371/43 |
| 4,217,660 | 8/1980 | En | 371/44 |
| 4,404,674 | 9/1980 | Rhodes | 371/43 |
| 4,493,082 | 1/1985 | Cumberton et al. | 371/43 |

FOREIGN PATENT DOCUMENTS 56-25853 5/1981 Japan .

OTHER PUBLICATIONS

Godard et al., "Phase Amplitude Coding in Modems" Technical Disclosure Bulletin, vol. 26, Jul. 2, 1983, pp. 662-664.
Bhargava, "Forward Error Correction Schemes for Digital Comm" IEEE Communication Magarzine, Jan. 1983, pp. 11-19.
Biglieri, "High-Level Modulation and Coding for Non-linear Satellite Channels" IEEE Transaction on Comm., vol. COM-32, May 84.

Primary Examiner—Robert L. Griffin
Assistant Examiner—Stephen Chin
Attorney, Agent, or Firm—Hale and Dorr

[57] ABSTRACT

A data stream is impressed on a carrier by forming from the data stream a succession of binary symbol words which control the modulation level of the carrier during respective modulation time intervals. To generate the symbol words from the data stream, the latter is first divided into a base bit stream (14) and one or more second bit streams (15). These second streams (15) are then subjected to error control coding before being used to define the least significant bits of the symbol words; the most significant bits are provided by the base bit stream. As a result, although the least significant bits of the transmitted symbol words (IV,III,II,I) are more prone to noise corruption than the most significant bits this tendency is compensated for by the error coding employed. The overall effect is to minimize power requirements while retaining good bandwidth efficiency.

9 Claims, 14 Drawing Figures

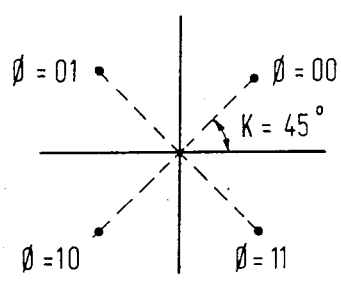
FIG 1A
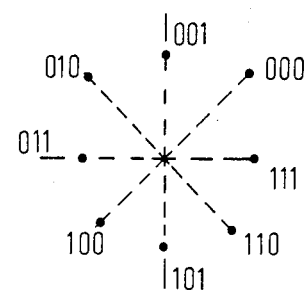
FIG 1B
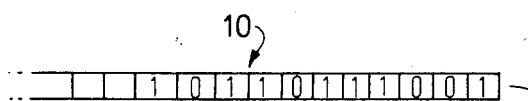
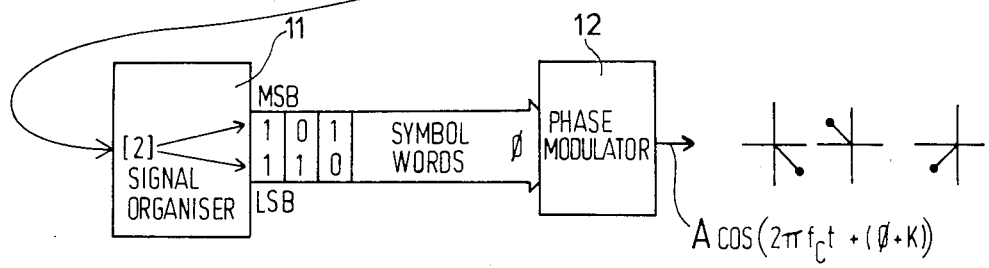
FIG 2
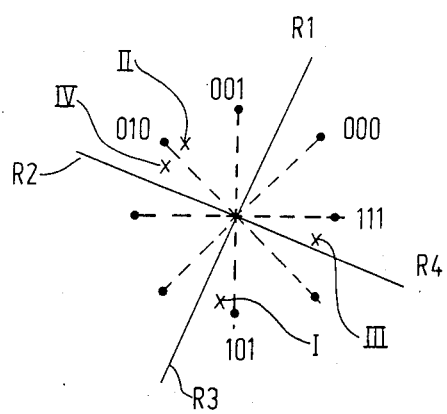
FIG 6

| DATA | CODEWORD | CORRELATION FOR: 1 0 0 1 | | 0 1 0 1 | |
|---|---|---|---|---|---|
| 000 | 1111 | + − − + | 0 | − + − + | 0 |
| 001 | 1010 | + + − − | 0 | − − − − | −4 |
| 010 | 1100 | + − + − | 0 | − + + − | 0 |
| 011 | 1001 | + + + + | 4 | − − + + | 0 |
| 100 | 0000 | − + + − | 0 | + − + − | 0 |
| 101 | 0101 | − − + + | 0 | + + + + | 4 |
| 110 | 0011 | − + − + | 0 | + − − + | 0 |
| 111 | 0110 | − − − − | −4 | + + − − | 0 |

| | CORRELATION OF STORED AND RECEIVED CODEWORDS FOR FIGURE 3 TRANSMISSION (OVERLAY '0101') | | | | | |
|---|---|---|---|---|---|---|
| | IDEAL | | | TYPICAL | | |
| SYMBOL | DIFFERENCE ANGLE | MULTIPLYING FACTOR FOR CORRELATION WITH | | DIFFERENCE ANGLE | MULTIPLYING FACTOR FOR CORRELATION WITH | |
| | | 1 0 0 1 | 0 1 0 1 | | 1 0 0 1 | 0 1 0 1 |
| IV | $-22\frac{1}{2}°$ | +1 | −1 | −12° | +1 | −1 |
| III | $+22\frac{1}{2}°$ | −1 | +1 | +8° | −1 | +1 |
| II | $-22\frac{1}{2}°$ | −1 | −1 | −31° | −1 | −1 |
| I | $+22\frac{1}{2}°$ | +1 | +1 | +18° | +1 | +1 |
| CORRELATION SUM → | | 0° | +90° | | +29° | +69° |

FIG 10

| CODEWORD | DATA |
|---|---|
| 1 1 1 1 1 1 1 1   1 1 1 1 1 1 1 1 | 0 0 0 0 0 |
| 1 0 1 0 1 0 1 0   1 0 1 0 1 0 1 0 | 0 0 0 0 1 |
| 1 1 0 0 1 1 0 0   1 1 0 0 1 1 0 0 | 0 0 0 1 0 |
| 1 0 0 1 1 0 0 1   1 0 0 1 1 0 0 1 | 0 0 0 1 1 |
| 1 1 1 1 0 0 0 0   1 1 1 1 0 0 0 0 | 0 0 1 0 0 |
| 1 0 1 0 0 1 0 1   1 0 1 0 0 1 0 1 | 0 0 1 0 1 |
| 1 1 0 0 0 0 1 1   1 1 0 0 0 0 1 1 | 0 0 1 1 0 |
| 1 0 0 1 0 1 1 0   1 0 0 1 0 1 1 0 | 0 0 1 1 1 |
| 1 1 1 1 1 1 1 1   0 0 0 0 0 0 0 0 | 0 1 0 0 0 |
| 1 0 1 0 1 0 1 0   0 1 0 1 0 1 0 1 | 0 1 0 0 1 |
| 1 1 0 0 1 1 0 0   0 0 1 1 0 0 1 1 | 0 1 0 1 0 |
| 1 0 0 1 1 0 0 1   0 1 1 0 0 1 1 0 | 0 1 0 1 1 |
| 1 1 1 1 0 0 0 0   0 0 0 0 1 1 1 1 | 0 1 1 0 0 |
| 1 0 1 0 0 1 0 1   0 1 0 1 1 0 1 0 | 0 1 1 0 1 |
| 1 1 0 0 0 0 1 1   0 0 1 1 1 1 0 0 | 0 1 1 1 0 |
| 1 0 0 1 0 1 1 0   0 1 1 0 1 0 0 1 | 0 1 1 1 1 |
| 0 0 0 0 0 0 0 0   0 0 0 0 0 0 0 0 | 1 0 0 0 0 |
| 0 1 0 1 0 1 0 1   0 1 0 1 0 1 0 1 | 1 0 0 0 1 |
| 0 0 1 1 0 0 1 1   0 0 1 1 0 0 1 1 | 1 0 0 1 0 |
| 0 1 1 0 0 1 1 0   0 1 1 0 0 1 1 0 | 1 0 0 1 1 |
| 0 0 0 0 1 1 1 1   0 0 0 0 1 1 1 1 | 1 0 1 0 0 |
| 0 1 0 1 1 0 1 0   0 1 0 1 1 0 1 0 | 1 0 1 0 1 |
| 0 0 1 1 1 1 0 0   0 0 1 1 1 1 0 0 | 1 0 1 1 0 |
| 0 1 1 0 1 0 0 1   0 1 1 0 1 0 0 1 | 1 0 1 1 1 |
| 0 0 0 0 0 0 0 0   1 1 1 1 1 1 1 1 | 1 1 0 0 0 |
| 0 1 0 1 0 1 0 1   1 0 1 0 1 0 1 0 | 1 1 0 0 1 |
| 0 0 1 1 0 0 1 1   1 1 0 0 1 1 0 0 | 1 1 0 1 0 |
| 0 1 1 0 0 1 1 0   1 0 0 1 1 0 0 1 | 1 1 0 1 1 |
| 0 0 0 0 1 1 1 1   1 1 1 1 0 0 0 0 | 1 1 1 0 0 |
| 0 1 0 1 1 0 1 0   1 0 1 0 0 1 0 1 | 1 1 1 0 1 |
| 0 0 1 1 1 1 0 0   1 1 0 0 0 0 1 1 | 1 1 1 1 0 |
| 0 1 1 0 1 0 0 1   1 0 0 1 0 1 1 0 | 1 1 1 1 1 |

DATA COMMUNICATION METHOD AND APPARATUS

The present invention relates to a data communication method and apparatus and in particular, but not exclusively, to a data modem for use in a satelite communication system.

BACKGROUND OF THE INVENTION

With the increasing use of satellites for business data communications there is a growing need for data modems with good efficiency of bandwidth and power.

Recent developments in high efficiency modems have tended to concentrate on power efficiency. Thus a modern data modem may take bits one or two at a time from a data stream that has been previously subject to Forward Error Control, and use these bits to control the level of phase modulation of a carrier during a corresponding modulation time interval, the resultant transmitted symbols each having two or four possible levels (this modulation process is generally referred to as two-or four-level phase shift keying, PSK). These modern modems have brought down the required satellite power by a factor in excess of 4 to 1 (6dB) with respect to the requirements of only a few years ago. However, this improved power efficiency has been at the expense of occupied bandwidth, which, allowing for adjacent channel guardbands, can be up to 3 or 4 times the data rate. At lower data rates there is sufficient bandwidth available for this to be accommodated but in the 2 or 4 Mbit/sec data rate range, bandwidth efficiency becomes much more critical.

One method of improving bandwidth efficiency is to increase the number of possible levels of each symbol to increase the number of transmitted bits/Hz of occupied bandwidth. However as the number of levels per symbol is increased, the symbol power has to be increased dramatically to prevent noise from increasing the bit error rate. The need for this dramatic increase is due to the fact that as the numbers of levels per symbol is increased, the different symbol combinations are not orthogonal to each other as in the two or four level symbol case and there is degradation similar in effect to cross-talk.

It is an object of the present invention to provide a data communication method and apparatus with good bandwidth and power efficiency.

SUMMARY OF THE INVENTION

According to one aspect of the present invention, there is provided a method of data communication including transmitting a binary data stream by a process including the steps of:

dividing the data stream into a first, base bit stream and at least one second bit stream;

subjecting the said at least one second bit stream to error control coding to produce at least one overlay bit stream, and utilising said base and overlay bit streams to generate a succession of symbol words of binary form for controlling the level of modulation of a carrier signal during respective modulation time intervals, the most significant bit or bits of each symbol word being derived from the base bit stream while the least significant bit or bits are derived from the said at least one overlay bit stream.

It will be appreciated that the least significant bits of the symbol words are those most likely to be corrupted by noise during their transmission as modulation of the carrier (that is, as a modulation symbol) since the margin for error is least for these bits. In the present system, the fact that these least significant bits have been subjected to error control coding enables their successful recovery at a receiver at much lower signal/noise ratios than would otherwise be possible. Thus an increase in bits/transmitted symbol can be achieved without the same power level increase penalty as would be incurred with standard multi-level symbol systems.

Further according to the invention, there is provided a method of data communication including receiving data transmitted in accordance with the last but one paragraph, the receiving process including the steps of:

generating a succession of modulation-level binary words representing the level of modulation of the carrier signal during respective modulation time intervals, deriving from the least significant bits of the modulation-level words at least one received overlay bit stream corresponding to the said at least one overlay bit stream generated during the transmission process;

effecting error correction on the said at least one received overlay bit stream in accordance with the error control coding implemented in the transmission process, removing the bits of the said at least one overlay bit stream, after error correction, from the modulation-level words and then utilising the latter to derive a received base bit stream corresponding to the said base bit stream generated during the transmission process, utilising the said at least one error-corrected received overlay bit stream to generate at least one received second bit stream corresponding to said at least one second bit streams generated during the transmission process, and combining the received base bit stream and the at least one received second bit stream to form a received data stream.

Where during the transmission process, two or more second bit streams are divided from the data stream, the security of the error control coding to which each stream is subjected is preferably made the greater, the less the significance of the system word bits determined by the stream concerned; the purpose of this is to compensate for the correspondingly higher risk of corruption of the least significant bits due to noise. In the receiving process, the received overlay bit stream made up of the least significant bit or bits will generally be generated, error corrected and removed from the modulation-level words before the second received overlay bit stream is detected and processed; this similarly applies to the other received overlay bit streams where present.

During the transmission process, the base bit stream may itself be subject to error control coding. Furthermore, the or each overlay bit stream may be divided into further streams at least one of which is subject to further error control coding before being used to determine the value of bits of the symbol word.

Generally, the bits of the base bit stream will be used one or two at a time to determine the most significant bit or bits of each symbol word. The bits of the or each overlay bit stream will generally be used one bit at a time to determine a corresponding bit of the symbol word.

The error control coding employed may be of the block or convolutional type. Preferably, however, an orthogonal or bi-orthogonal block code is used. Furthermore, the symbol words are preferably used to control phase shift keying of the carrier signal.

Advantageously, the binary data stream is divided into said first base, stream and two said second streams, the second streams being error coded using respective codes whereby to produce respective said overlay bit streams which are then used one bit a time in generation of said succession of symbol words, the codeword length of said codes used in producing each overlay stream being the greater the lesser the significant in each symbol word of the bit contributed by that overlay stream.

In one embodiment of the invention, a data stream to be transmitted is taken eighty-six bits at a time, sixty four bits being used to form the base bit stream, sixteen bits to form one said second bit stream and six for another second bit stream. The sixteen bits of the said one second bit stream are converted, in groups of four, using a bi-orthogonal code of length eight to form a first overlay bit stream of thirty two bits. The six bits of the said another second bit stream are converted, using a bi-orthogonal code of length thirty two, into a second overlay bit stream also of thirty two bits. Thirty-two 4-bit symbol words are then formed by taking two bits from the base stream for the two most significant bits of each word, one bit from the first overlay stream to form the third most significant bit, and one bit from the second overlay stream to form the least significant bit of the symbol word. During the receiving process, the second overlay is first detected, subjected to error correction by correlation with all possible bi-orthogonal code words of length thirty two, and then subtracted from the modulation-level binary words: next the first overlay is detected, error corrected and subtracted, leaving binary words representing four-level symbols determined by the bits of the base bit stream. The error corrected overlays are decoded and recombined with the base stream.

In another embodiment, three second bit streams are formed and are error coded using bi-orthogonal codes respectively of length four, sixteen and sixty four. As with the preceding embodiment, the base stream is taken two bits at a time, and the overlay streams one bit at a time, to form the symbol words.

According to another aspect of the present invention, there is provided data communication apparatus for transmitting a binary data stream, characterised in that said apparatus comprises:

data-stream dividing means for dividing the data stream into a first, base bit stream and at least one second bit stream, error-coding means arranged to subject the said at least one second bit stream to error control coding to produce at least one overlay bit stream, and a signal organiser arranged to receive said base and overlay streams and to generate therefrom a succession of symbol words of binary form for controlling the level of modulation of a carrier signal during respective modulation time intervals, the most significant bit or bits of each symbol word being divided from the base bit stream while the least significant bit or bits are derived from the said at least one overlay bit stream.

According to a further aspect of the present invention, there is provided data communication apparatus arranged to receive carrier-signal base data transmitted in accordance with the method set out in the last preceding paragraph but ten, said apparatus comprising:

demodulator means for generating a succession of modulation-level binary words representing the level of modulation of the carrier signal during respective modulation time intervals.

overlay detector means for deriving from the least significant bits of the said modulation-level words at least one received overlay bit stream corresponding to the said at least one overlay bit stream generated during the transmission process, the overlay detector means being arranged to effect error correction on the said at least one received overlay bit stream in accordance with the error control coding implemented in the transmission process, overlay subtractor means for removing the bits of the said at least one overlay bit stream, after error correction, from the modulation-level words, base-stream decoder means arranged to utilise said modification-level words, after subtraction of said overlay stream bits, to derive a received base bit stream corresponding to the said base bit stream generated during the transmission process, overlay decoder means arranged to utilise the said at least one error-corrected received overlay bit stream to generate at least one received second bit stream corresponding to said at least one second bit stream generated during the transmission process, and combining means combining the received base bit stream and the at least one received second bit stream to form a received data stream.

BRIEF DESCRIPTION OF THE DRAWINGS

Several forms of data communication modem embodying the present invention will now be described by way of example, with reference to the accompanying diagrammatic drawings, in which:

FIGS. 1A and 1B are diagrams illustrating the possible phase states respectively of a four-level and eight-level phase shift keyed (PSK) carrier;

FIG. 2 is a schematic diagram of the transmitter section of a prior art modem employing four-level PSK;

FIG. 5 is a Table showing the encoding of three data bits as bi-orthogonal codewords of length 4 and also illustrating the cross-correlation characteristics of these codewords;

FIG. 6 is a phase state diagram illustrating the detection of the least significant bit of a transmitted symbol;

FIG. 7 is a Table illustrating the correlation of stored and received codewords effected in the receiving section illustrated in FIG. 4;

FIG. 10 is a Table showing the encoding of five date bits as bi-orthogonal codewords of length 16;

DESCRIPTION OF THE PREFERRED EMBODIMENTS

Before describing the two data modems embodying the present invention that are shown in FIGS. 3, 4 and 8, 9 a brief description will be given, with reference to FIGS. 1A and 2, of the transmitter section of a prior art data modem.

The FIG. 2 modem utilises four-level phase shift keying (sometimes referred to as quadrature phase shift keying or QPSK). A data bit stream 10 to be transmitted is fed to a signal organiser block 11 which forms binary symbol words therefrom by taking bits two at a time (as indicated by the number in square brackets in block 11) from the bit stream. The symbol words may each be considered as representing the value of an angle $\phi$; since each symbol word is composd of two bits, there are four possible values for the angle $\phi$. The symbol words are fed in turn to a phase modulator 12 where they determine the phase modulation of a carrier signal of frequency $f_c$ during respective modulation time intervals, the modulator 12 outputting a series of modulation symbols each having one of four possible phase states depending on the value of $\phi$. During each modulation time interval, the modulator output can be expressed as:

$$A \cos (2\pi f_c t + \phi + K)$$

where A and K are constants. The arrangement of the modulator 12 is generally such that the four possible values of $\phi$ are spaced by 90° as indicated in FIG. 1A for the case where K=45°.

By way of example, typical values for three symbol words are indicated in FIG. 2 together with the resultant transmitted modulation symbols.

The decoding of the modulation symbols in the receiving section (not illustrated) of a receiving modem can be simply effected by deriving a binary word representing the phase modulation value $(\phi+K)$ and then determining the nearest one of the four possible phase states. Where the binary words representing the modulation level have a full range corresponding to $(\phi+K)$ varying from 0° to 360°, then with K=45°, the decoding simply reduces to utilising the first two bits of each binary word as these bits represent the angle quadrant of the received symbol.

An eight-level PSK modem takes a form very similar to that of the QPSK modem of FIG. 2 except that each binary symbol word is formed by three bits from the bit stream to be transmitted, and each transmitted symbol has eight possible phase states, typically distributed as illustrated in FIG. 1B. Due to the fact that in eight-level PSK the angular spacing between possible phase states is half that of QPSK, if the same noise immunity is to be achieved then the signal power must be higher for eight level PSK than for QPSK.

Figure 3:
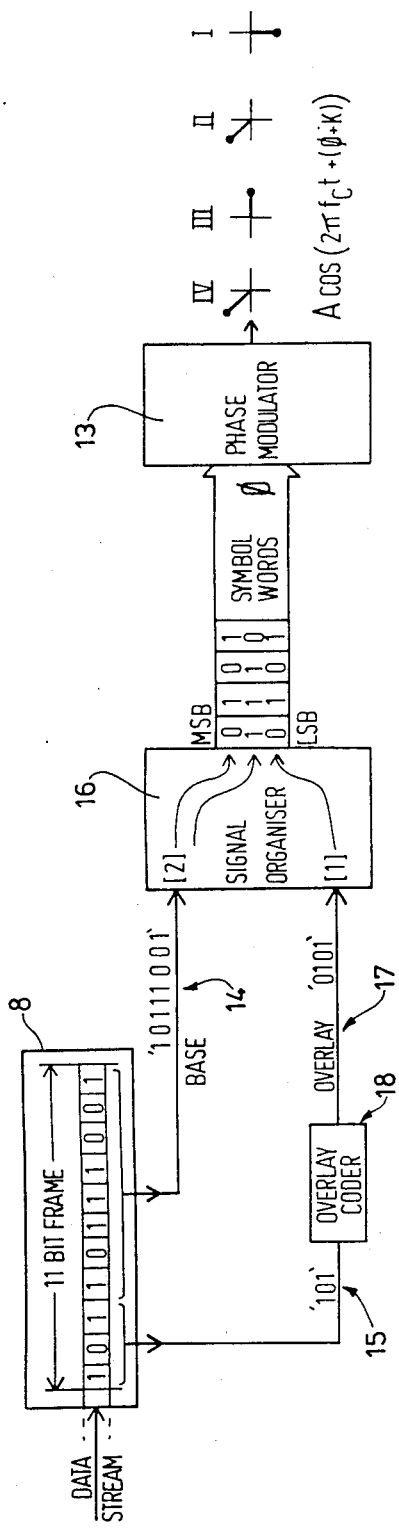
FIGS. 3 and 4 are schematic diagrams of the transmitter and receiving sections respectively of a first form of modem embodying the present invention.
Figure 4:
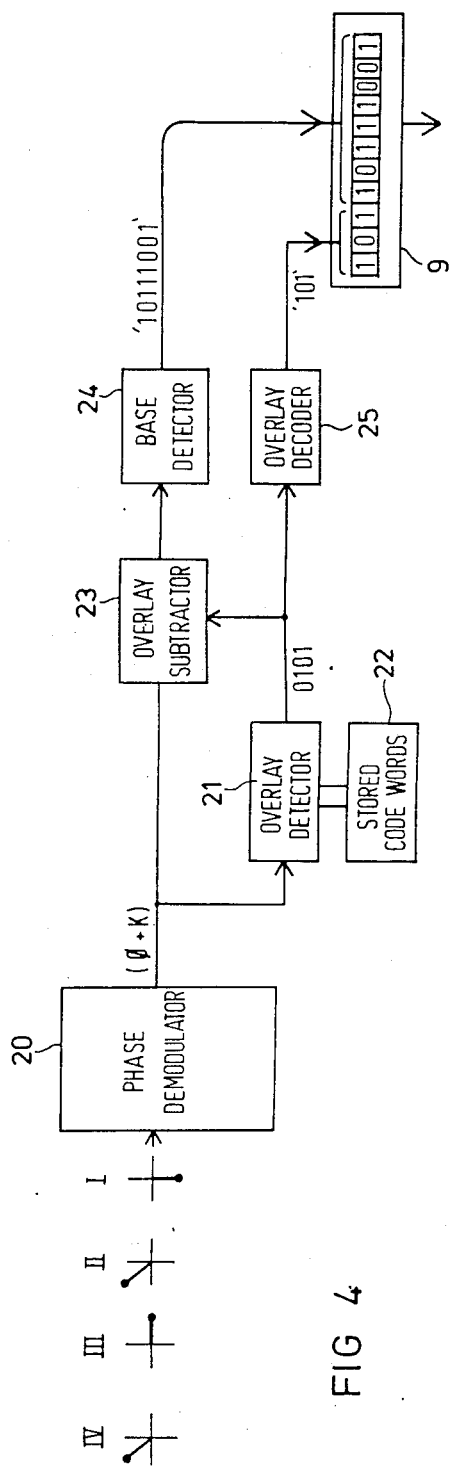

The embodiment of the invention shown in FIGS. 3 and 4 will now be considered. FIG. 3 illustrates in schematic form the transmitting section of a data modem. The transmitting section includes a phase modulator 13 arranged to receive a succession of three-bit symbol words, representing an angle $\phi$, and to output, during respective modulation time intervals, corresponding modulation symbols having one of eight possible phase values $(\phi+K)$ where K is a constant generally equal to 45° (see FIG. 1B); the phase modulator 13 thus acts as a standard eight-level PSK modulator. It is in the generation of the symbol words that the FIG. 3 modem differs markedly from a standard eight-level PSK modem.

As is diagrammatically depicted in FIG. 3, the data bit stream to be transmitted is divided in block 8 into bit streams, namely a first, or base, bit stream 14 and a second bit stream 15. For each eleven bits of the data stream, eight bits are used to form the base stream 14 and three bits are used for the second stream 15. In FIG. 3, the base bits are shown as the first eight bits of an eleven bit 'frame' of the data stream; this positioning of the base-stream bits within the frame is not, however, critical and bits from any position within the frame can be used to make up the eight base-stream bits.

The base stream 14 is passed to one input of a signal organiser 16 which takes two bits at a time from this stream (as indicated by the figure in square brackets) to form the two most significant bits (MSBs) of successive symbol words.

The second bit stream 15 is subjected to error control coding before being passed as an overlay bit stream 17 to a second input of the signal organiser 16, the bits of this overlay stream being taken one at a time to form the least significant bit of each successive symbol word.

In the present embodiment, the error control coding to which the second-stream bits are subjected, involves the conversion of each group of three second-stream bits into a corresponding biorthogonal codeword of length four. The two leftmost columns of the FIG. 5 Table show the correspondence between the possible values of three data bits and the biorthogonal codewords.

A property of biorthogonal codewords is that when any codeword is correlated with all codewords of the same length on the basis that a bit match is valued as (+1) and a mismatch as (−1), then a correlation peak equal in value to the codeword length is produced when the codeword is correlated with itself whereas all other correlations sum to zero-with the exception of the correlation with the inverse codeword where a negative correlation peak is produced. This property is illustrated in the righthand columns of the FIG. 5 Table where the codewords '1001' and '0101' are both correlated against the whose set of codewords of length four (note in this Table the bit correlation values of (+1) and (−1) have been abbreviated to '+' and '−'). The correlation properties of the biorthogonal codewords is used in the receiving section of the modem and will be considered in more detail hereinafter.

The three second-stream bits derived from each elevenbit data-stream frame are thus converted in an overlay coder block 18 to a four-bit biorthogonal codeword which is output as the overlay bit stream 17.

The signal organiser 16 operating in the manner already described, takes the eight base-stream bits derived from one data-stream frame and the corresponding four overlay-stream bits, to form four three-bit symbol words, the least significant bits of which are determined by the bits of the overlay bit stream. The four symbol words in turn control the generation of four modulation symbols I, II, III, IV.

By way of example, arbitary values have been assigned to the bits of the data-stream frame illustrated in FIG. 3; the resulting values of the base and overlay streams, of the symbol words and of the transmitted symbols are also shown.

FIG. 4 schematically illustrates the receiving section of the data modem. This receiving section includes a demodulator 20 arranged to detect the angle of phase modulation of successively received symbols I, II, III, IV of the modulated carrier, the demodulator outputting a multi-bit (for example 8-bit) binary word indicative of the modulation angle ($\phi+K$). The resolution of the demodulator output words is greater than that of the symbol words.

The first operation carried out on the demodulator output words is the determination therefrom of the state of the LSB of each corresponding transmitter symbol word whereby to reconstitute the overlay bit stream (albeit possibly with noise induced errors).

The detection of the LSB state of each symbol word from the corresponding demodulator output word is effected in block 21 in the manner described below with reference to FIG. 6. Considering the case where the two MSBs of a symbol word are '00', the two possible values of the symbol word are then '000' and '001' or, in terms of modulation angle ($\phi+K$), +45° and +90°. By comparing the actual received angle ($\phi+K$), as represented by the binary word output from the demodulator, with a reference angle, also represented by a binary word, lying midway between the values +45° and +90° (that is, an angle of 77½° -see line R1 in FIG. 6), it is possible to place a value on the likelihood of the LSB of the symbol word being a '1' or a '0'. In perfect conditions, an LSB of '1' would result in a difference angle between the reference R1 and the actual received phase angle of +22½° whereas an LSB of '0' would give a difference angle of −22½°. In fact, the presence of noise is likely to make the detected difference angle different from those values.

The assessment of the LSB state for the other combinations (01, 10, 11) of MSBs of a transmitter symbol word is carried out in a similar manner relative to angle references R2, R3, R4 (see FIG. 5). Of course, at the stage of LSB detection in the receiving section of the data modem, the values of the two MSBs of the symbol word are unknown and therefore each reference R1, R2, R3, R4 must be subtracted in turn from the modulation output word, the smallest difference angle being taken as the one indicating the LSB state of the corresponding symbol word. The LSB assessment process can, for example, be effected using a microprocessor or, alternatively, by means of a ROM decoder addressed by the demodulator output and programmed with the LSB state corresponding to each possible input.

Once the LSB of each of the four symbol words corresponding to an 11-bit frame of the transmitted data stream has been detected, the overlay codeword constituted by these four LSB's is subject to error correction by correlation with each of the eight possible codewords of length four, these words being held in a store 22.

As already noted, this correlation should produce a positive correlation peak when the received overlay codeword matches the stored codeword with which it is being correlated, all other correlations summing (ideally) to zero except for that between the received codeword and the inverse stored codeword where a negative correlation peak is produced.

The Table shown in FIG. 7 illustrates the correlation process both for ideal and typical reception of the overlay codeword '0101' embedded in the transmission illustrated in FIG. 3. Under ideal conditions, the difference angle between the modulation angle ($\phi+K$) of the first symbol I (this angle being that produced by the first symbol word '101', that is an angle of 270°) and the corresponding reference R3, is +22½°; similarly for the symbols II, III and IV the difference angles are −22½°, +22½°, −22½° respectively.

In the correlation process, each stored word is taken in turn and correlated with the received overlay codeword as represented by the difference angles (represented in binary form). Where a bit of the stored codeword being correlated has a value '1', the difference angle representing the corresponding bit of the received overlay codeword is multiplied by '+1' whereas when the stored codeword bit value is '0', the corresponding difference angle is multiplied by '−1'. Once the difference angles have been weighed in this manner, they are summed to produce the correlation sum for the codeword under consideration. The FIG. 7 Table shows this correlation process for two stored words only, namely "1001" and "0101"; as can be seen from the ideal case shown in the left-hand half of the FIG. 7 Table, where the received overlay codeword and stored codeword correspond (codeword "0101") a correlation sum of 90° is produced whereas for the out-of-correspondence case (codeword "1001") a zero sum is produced.

(It should be noted that in the heading of the FIG. 7 Table the codewords are set down in the same manner as in FIG. 3, that is with the first transmitted bit in the right hand-most position; for this reason, the symbols have been set down in reverse, with the first to be transmitted being lowermost).

Of course, the purpose of the correlating process is to facilitate codeword detection in the presence of noise, and the right-hand half of the FIG. 7 Table illustrates the correlation process in the case where the received modulation angles ($\phi+K$) of the four symbols I, II, III, IV differ from their transmitted values to the extent indicated by the referenced crosses in FIG. 6. It is clear from the FIG. 7 Table that even in the presence of significant noise, the correlation process still permits the correct detection of the overlay codeword.

After detection, with error correction, of the codewords constituting the overlay bit stream, this overlay is removed from the binary words output by the demodulator to effectively transform these words from ones representing an eight-level phase modulation into words representing a four-level phase modulation. This is achieved in block 23 by subtracting from the demodulator output word a binary value corresponding to 45° when the corresponding bit of the overlay stream is a binary "1" while leaving the demodulator output word unchanged when the corresponding overlay stream bit has a value "0". Conceptually, this corresponds to reversing the rotation imposed by the LSB of each transmitter symbol word on the four-level symbol that represents the two MSB of the symbol word.

The binary words output from the overlay subtractor block 23 each represent the two MSB's of a corresponding symbol word formed in the transmitting section, these bits having been derived from the base bit stream. As has already been described with reference to the prior art QPSK system of FIG. 2, it is a relatively simple matter to determine which bit pairing (00,01,10,11) is represented by each word output from block 23 and to reconstitute the base bit stream; this process is effected in block 24 of FIG. 4.

The error-corrected codewords of the overlay bit stream output from the block 21, as well as being fed to the overlay subtractor block 23, are also fed to an overlay decoder block 25 where each four-bit codeword is translated into the corresponding three data bits. The outputs of the base detector block 24 and overlay decoder block 25 are then recombined as illustrated in block 9 of FIG. 4 to reconstitute successive frames of the original data stream.

It will, of course be appreciated that the various blocks of the receiving section shown in FIG. 4 primarily represent functions in the receiving process rather than actual physical hardware blocks (though, of course, a receiver having a physical block form similar to FIG. 4 could be constructed). In fact, since the functions of the blocks 21 to 25 are all concerned with processing binary words, these blocks can be conveniently implemented by means of a microprocessor as will be apparent to persons skilled in the relevant art.

From the foregoing description of the data modem shown in FIGS. 3 and 4, it can be seen that eleven data bits have been transmitted in four modulation symbols that is, 2.75 bits/symbol. While each transmitted symbol has eight possible states, the noise immunity of the system is much better than with standard eight-level PSK because the most noise vulnerable bits of information, (that is, those represented by the LSB of each transmitted symbol word) have been subjected to error control coding prior to transmission which greatly increases their noise immunity.

The correct operation of the modem receiving section shown in FIG. 4, and in particular the proper operation of the overlay detector 21, depends on the receiving section being able to identify the start of each new overlay codeword carried by the incoming symbols. One way of identifying to the receiving section that a new codeword is about to begin would be to insert a brief pause between the transmission of the symbols associated with each eleven-bit frame of the data stream. Rather than inserting a pause between each frame, a more economic arrangement would be to insert a pause after every N frames. Suitable circuitry provided in the receiving section could then be used to identify this pause and synchronise the operation of the receiving section with the incoming stream of symbols. The design of suitable detection circuitry is well within the scope of persons skilled in the art and will therefore not be considered further herein.

An alternative way of arranging for the receiving section to identify the start of each overlay codeword is to correlate each stored codeword with successive groupings of four overlay bits, each successive grouping losing one bit at one end and gaining one at the opposite end as compared with its predecessor. One in four groupings will correspond to a codeword and the correlation of this grouping with its corresponding stored codeword will produce a high correlation sum. By detecting the grouping for which such a good correlation is achieved, it is possible to determine the boundaries of the received overlay codewords.

The second embodiment of the invention will now be described with reference to FIGS. 8 and 9 of the accompanying drawings. This second embodiment is very similar to the first embodiment already described except that a second overlay bit stream is additionally generated and gaining one at the opposite end as compared with its predecessor. One in four groupings will correspond to a codeword and the correlation of this grouping with its corresponding stored codeword will produce a high correlation sum. By detecting the grouping for which such a good correlation is achieved, it is possible to determine the boundaries of the received overlay codewords.

The second embodiment of the invention will now be described with reference to FIGS. 8 and 9 of the accompanying drawings. This second embodiment is similar to the first embodiment already described but here a second overlay bit stream is additionally generated and used to determine a fourth bit of each symbol word in the transmitter section of the modem.

Figure 8:
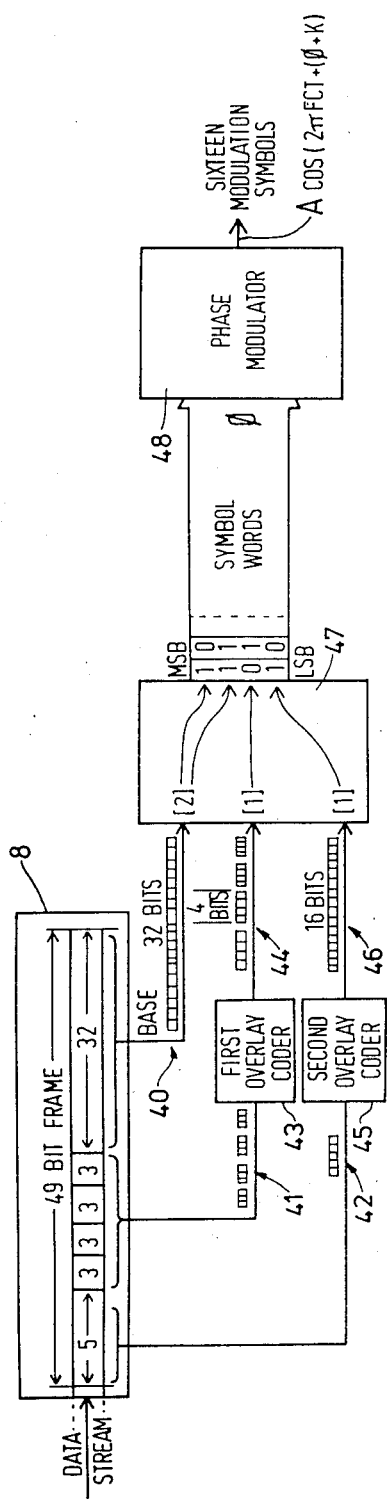
FIGS. 8 and 9 are schematic diagrams of the transmitter and receiving sections respectively of a second form of modem embodying the invention.

As is illustrated in FIG. 8, the data stream to be transmitted is processed in 49-bit frames. Thirty-two bits of each frame are divided off in block 8 to form a base bit stream 40; twelve bits are used to form one second bit stream 41; and five bits are used to form another second bit stream 42. For each frame, the twelve bits of the first-mentioned second bit stream are taken three at a time and coded in block 43 as orthogonal codewords of length four to form a first overlay bit stream 44 in the same manner as for the overlay bit stream 17 of the FIG. 3 modem. The five bits of the other second bit stream 42 are coded in block 45 as a single bi-orthogonal codeword of length sixteen to form a second overlay bit stream 46.

The base bit stream 40, the first overlay bit stream 44, and the second overlay bit stream 46 are fed to respective inputs of a signal organiser 47. This organiser 47 forms for each forty-nine bit frame of the data tream, sixteen four-bit symbol words each made up of two bits from the base stream 40, one bit from the first overlay bit stream 44, and one bit from the second lverlay bit stream 46. The two bits from the base bit stream 40 constitute the two most significant bits (MSB) of the corresponding symbol word while the single bit taken from the first and second overlay streams 44, 46 respectively constitute the third MSB and the least significant bit (LSB) of the symbol word. The generated symbol words are fed to a phase modulator 48 where they determine the phase state of respective modulation symbols, each symbol having sixteen possible states as determined by the four bits of the corresponding symbol word.

Of course, with sixteen possible states for each transmitted symbol, there is much greater chance of noise induced errors being present at the receiving modem for the least significant bit of the symbol word being communicated by each symbol. It is in order to overcome this increased susceptibility to noise of each LSB transmitted, that the bi-orthogonal code words used in coding these LSB's are of a much greater length than used for the second least significant bits; in other words, the second overlay bit stream uses a bi-orthogonal code of a much greater length than used for the first overlay bit stream in order to offset the increases susceptibility to noise experienced by the bits of the second overlay stream during transmission. It can be shown that adequate compensation for the increase of susceptibility to noise can be achieved by using for the second overlay stream bi-orthogonal codewords four times the length of those used for the first overlay stream. It is for this reason that bi-orthogonal codewords of length sixteen are used in the present example to form the second overlay bit stream 46.

The Table shown in FIG. 10 lists the thirty two possible bi-orthogonal codewords of length sixteen together with the five data bits represented by each codeword.

Figure 9:
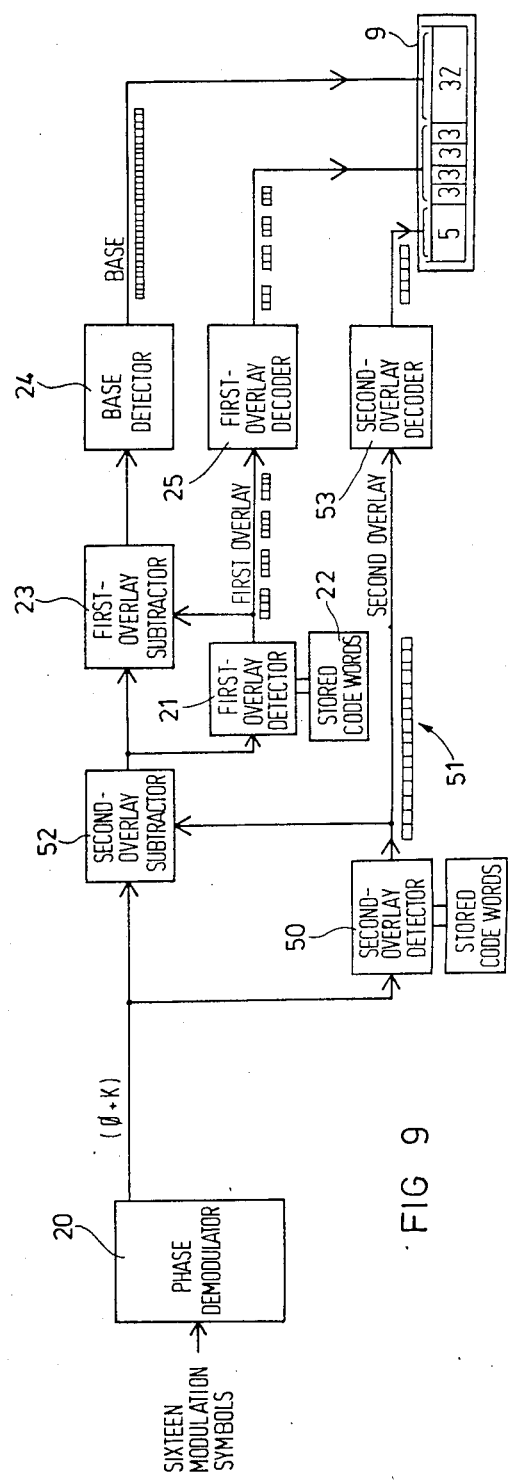

The receiving section of the second embodiment is shown in FIG. 9 and includes a phase demodulator 20 outputting binary words indicative of the phase modulation angle ($\phi + K$) of each successively received symbol. The receiving section operates by detecting and subtracting the second and first overlay bit streams from the demodulator output words before converting the latter into the base bit stream. The operation of the FIG. 9 receiving section is thus analogous to the operation of the FIG. 4 receiving section except that the second overlay bit stream is first detected and subtracted from the demodulator output words. This detection of the second overlay bit stream is effected in block 50, this block 50 operating in substantially the same manner as the block 21 in FIG. 4. Similarly, the block 50 also effects error correction by a correlation process involving correlating each codeword group of sixteen bits of the detected second overlay bit stream with the set of stored bi-orthogonal codewords of length sixteen, this process being analogous to the process carried out by the block 21 of FIG. 4, the only difference being the length of the codewords used.

The error-corrected second overlay bit stream 51 output from the block 50 is subtracted in subtractor 52 from the demodulator output words whereafter these words are processed in identical manner as for the FIG. 4 receiving section. For this reason, the further processing of the words output by the subtractor 52 that form the base bit stream and first overlay bit stream will not be described, reference being directed to the corresponding description given in relation to the FIG. 4 receiving section; furthermore, the functional blocks effecting the further processing in the FIG. 9 receiving section have been given the same references as used for their equivalents in FIG. 4.

The codewords of the second overlay bit stream 51, as well as being fed to the subtract block 52, are also fed to a second ovelay decoder 53 which converts these codewords into the corresponding data bits in accordance with the FIG. 10 Table.

The bit streams output by the base detector 24, and the two overlay decoders 25 and 53 are then combined in block 9 to reconstitute the original data stream.

In the second embodiment, the determination of the codeword boundaries in the received overlay bit streams can be achieved by the same general methods employed for the first embodiment. Where a correlation technique is used, this is, of course, applied to the overlay stream first to be isolated so that in the present example, successive groupings of sixteen bits from the second overlay stream are correlated in turn with each stored codeword.

The modem of FIGS. 8, 9 differs from that of FIGS. 3, 4 by the utilisation of an additional overlay bit stream. It is in fact possible to provide for the generation and utilisation of one or more further overlay bit streams additional to the first and second overlay streams of the modem of FIGS. 8, 9. Thus, for example, a third overlay bit stream may be generated for the FIG. 8 transmitter section by taking groups of seven data bits and converting them into corresponding bi-orthogonal codewords of length sixty four (the code word length being four times that used to generate the second overlay bit stream for reasons already discussed). With this latter arrangement, a data stream frame of two hundred and three bits is converted into sixty four five-bit symbol words with the two most significant bits of each word being taken from a base bit stream constituted by one hundred and twenty eight of the data-stream bits, the third most significant bit of each word being taken from the first overlay bit stream constituted by sixteen bi-orthogonal codewords of length four derived from forty eight data-stream bits, the fourth most significant bit of each word being taken from a second overlay stream constituted by four bi-orthogonal codewords of length sixteen derived from twenty data-stream bits, and the least significant bit of each word being taken from a third overlay bit stream constituted by one bi-orthogonal codeword of length sixty four derived from seven data-stream bits. In the receiving section of the modem, the third overlay bit stream is removed first followed by the second and first overlay streams. Where a fourth and possibly further overlay bit streams are used, then these are also removed in turn in the receiving section starting with the overlay stream corresponding to the least significant bit of the transmitted symbol words.

It is not, of course, essential that the first overlay bit stream be derived using bi-orthogonal codes of length four. Thus, for example, in a variant of the modem of FIGS. 8, 9 the first overlay bit stream is generated from bi-orthogonal codewords of length eight while the second overlay stream is generated from bi-orthogonal codewords of length thirty two. In this latter arrangement, the data stream bits are taken in frames of eighty-six bits, sixty-four bits being used to form the base bit stream, sixteen bits being converted in groups of four into four codewords of length eight constituting the first overlay stream, and six bits being converted to a codeword of length thirty two forming the second overlay stream. The bits of the base, first overlay and second overlay streams are then combined to form thirty-two four-bit symbol words.

Indeed, the error coding process performed on the or each second bit stream divided from the data stream need not be by way of bi-orthogonal codes as in the two embodiments described with reference to FIGS. 3, 4 and 8, 9. Provided the required level of noise protection is provided it is in fact possible to use any suitable form of error control coding including both block and convolutional codes.

It is also to be noted that while in the embodiments described, bits are taken in pairs from the base stream and singly from the overlay stream to form the symbol words, it is possible to vary this arrangement with any appropriate number of bits being taken from each stream to form each symbol; it is envisaged, for example, that in certain applications only one bit will be taken from the base stream as well as from the overlay streams in forming each control word. Where two or more bits of an overlay stream are used for each symbol word then the security of the error control coding used for that overlay stream should be appropriately high as the spacing between possible phase states is being reduced by a proportionally larger amount.

Other variations are possible to the embodiments of the invention illustrated in FIGS. 3, 4 and 8, 9. Thus in arrangements where two or more overlay bit streams are utilised, each overlay stream other than the first may be derived by dividing out bits from the preceding overlay stream, rather than direct from the data stream, and subjecting these divided out bits to a further error control coding process.

It will be appreciated that the data stream itself may be subjected to error control coding before division into first and second streams. Furthermore, the base stream may also be subject to error control coding. Finally, while in the illustrated embodiments the symbol words are used to control phase modulation of a carrier it is, of course, possible to use the words to control other types of carrier modulation such as frequency modulation.

Figure 11:
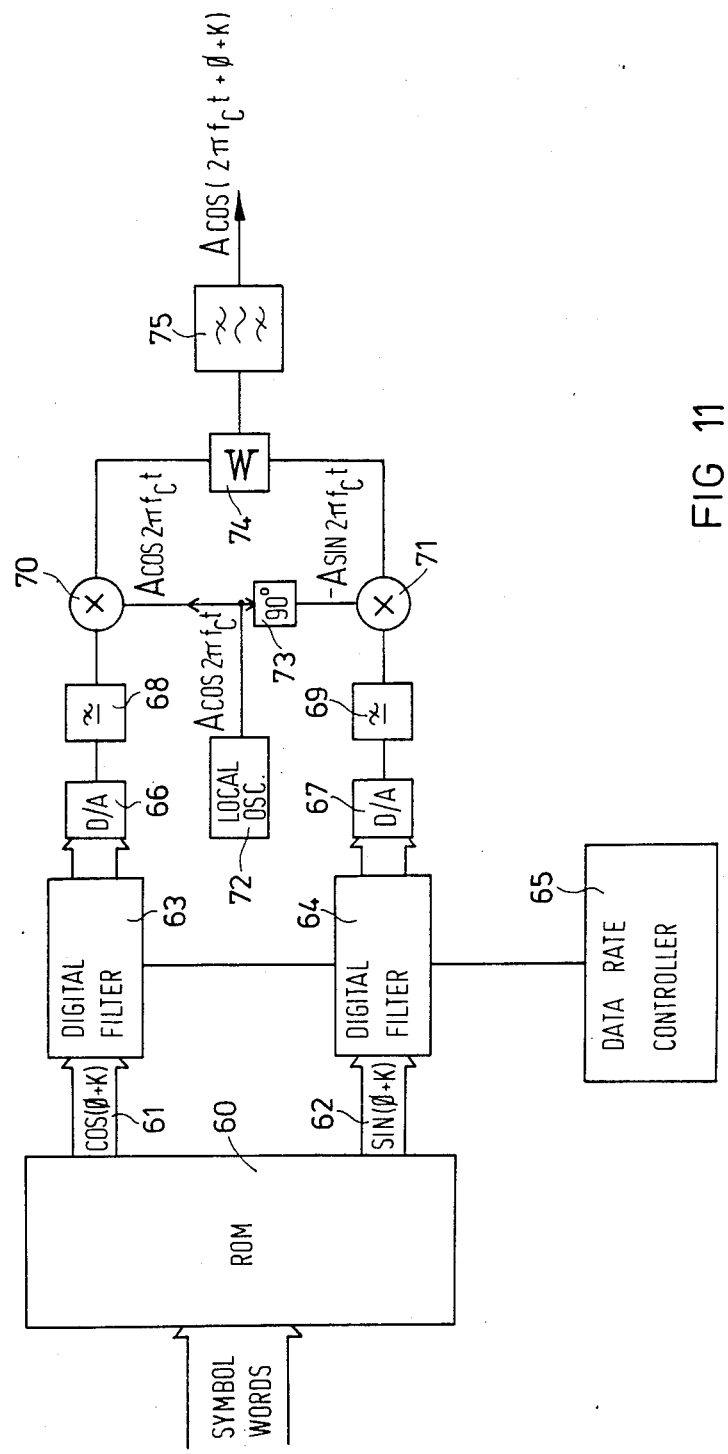
FIG. 11 is a block diagram of a phase modulator suitable for use in the transmitter section of the first and second forms of modem.

Having discussed in detail the formation of the symbol words in accordance with the invention and their detection in the modem receiving section, a description will now be given of a suitable form of phase modulator and demodulator for the modems of FIGS. 3, 4 and 8, 9. FIG. 11 shows a phase modulator arranged to receive the binary-form symbol words. As already mentioned, these words can be considered as representing an angle $\phi$ and serve to control the phase modulation of a carrier of frequency $f_c$ by an angle $(\phi+K)$. To this end, the symbol words are fed in turn to a read only member 60 arranged to output, for each input symbol word, first and second binary words, on buses 61 and 62, which respectively represent the values of the functions cos $(\phi+K)$ and sin $(\phi+K)$ for the symbol word concerned.

The outputs of the ROM 60 are thus two digital streams each having a word rate equal to the symbol rate. In order to effect spectrum shaping, the ROM outputs are fed to a pair of digital filters 63, 64 which may be of any suitable form. In the present example, the filters 63, 64 are constituted by interpolation filters the output clock rates of which are a multiple of the symbol rate. The symbol rate, the output clock rate of the interpolation filters, and the digital filter spectral response are selected for a given data rate, by a data rate controller 65.

The output of each digital filter 63, 64 is fed to a respective digital/analogue converter 66, 67 and from there via a respective low pass filter 68, 69 to one input of a respective mixer 70, 71.

A local oscillator 72 is arranged to generate a signal A cos $2\pi f_c t$ where the value of $f_c$ is typically 70 MHz. This signal is fed direct to a second input of the mixer 70, that is, the mixer receiving the filtered signal cos $(\phi+K)$. The output of the mixer 70 is thus cos $(2\pi f_c t).\cos(\phi+K)$.

The output of the local oscillator 72 is also fed, via a 90° phase shifter 73, to a second input of the mixer 71 the first input of which is arranged to receive the filtered signal sin $(\phi+K)$. The output of the mixer 71 is thus $-\sin(2\pi f_c t).\sin(\phi+K)$.

The outputs of the two mixers 70 and 71 are added together in a summer 74 the output of which is passed through a bandpass filter 75 to eliminate out-of-band spurious signals and harmonics that may have been generated by the mixers. The output of the filter 75 is the signal a $\cos(2\pi f_c t+\phi+K)$.

Generally the output of the filter 75 constitutes the output of the IF stage of the modem transmitter section.

Where the FIG. 11 phase modulator forms part of a modem intended for use with a communications satellite, then additional components are preferably provided to make the signal output therefrom better suited to the characteristics of the transponder of the communications satellite. Satellite transponders are generally built around travelling wave tube power amplifiers; due to the non-linear characteristic of such an amplifier it is best to only transmit constant envelope signals through the transponder. However, a signal that has constant envelope at all times usually has a very wide bandwidth and it is therefore generally necessary to restrict the signal bandwidth in order to prevent interference with adjacent channels. With reference to the FIG. 11 phase modulator, a side effect of the two bandwidths limiting filters 63, 64 is to introduce envelope variations which are exacerbated by certain sequences of phase states (for example, by successive symbols being in anti-phase relation).

Figure 12:
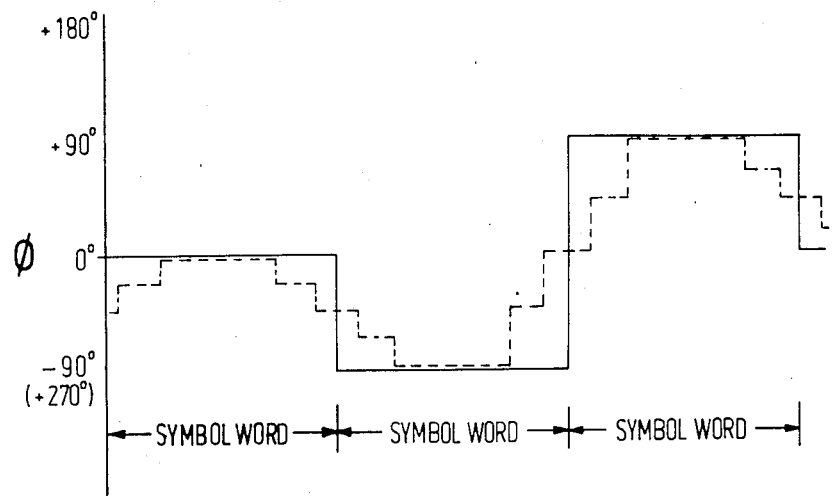
FIG. 12 is a diagram illustrating the effect of carrying out interpolation between phase states in the FIG. 11 phase modulator.

One way of dealing with this problem is to interpolate the sequence of phase shifts to restrict the bandwidth of the phase-modulator output signal without introducing envelope variations. This can be achieved by fronting the ROM 60 with an interpolator (not shown) receiving symbol words at a rate, say, of 1/T and outputting interpolated words at a multiple m/T of the symbol rate. The interpolator interpolates in a non-linear fashion between phase states represented by the symbol words. This process is illustrated in FIG. 12 where the phase states of successive symbol words are represented by solid lines and the corresponding interpolated phase values are shown in dashed lines.

Another way of avoiding adverse envelope variations is to control the generation of symbol words in such a manner that certain sequences of phase states are forbidden. Such an arrangement would be particularly simple to implement where a microprocessor is used to process the data stream to be transmitted, the microprocessor functioning to generate the base and overlay bit streams and to organise them into symbol words. By arranging for the microprocessor to compare successive symbol words with each other it is possible to prevent the output of symbol word sequences producing undesirable phase state transmissions. It should be noted that the prevention of certain phase sequences does in fact serve to reduce the data capacity of the overall system.

Figure 13:
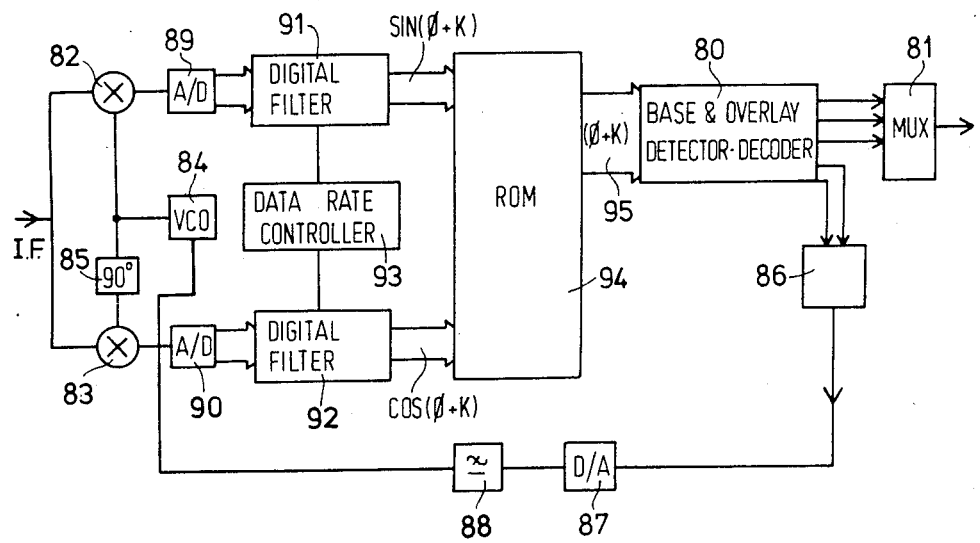
FIG. 13 is a block diagram of a phase demodulator suitable for use in the receiving section of the first and second forms of modem.

FIG. 13 shows one possible form of the phase demodulator for the modem receiving sections shown in FIGS. 4 and 9. In addition to the phase demodulator components, FIG. 13 also shows as block 80 the base and overlay stream detector-decoder circuitry of the receiving section, and a multiplexer block 81 for reconstituting the transmitted data stream from the base and overlay streams.

The signal fed to the phase demodulator will generally be an IF signal. This signal is fed to the input of two mixers 82, 83 to which are also fed sin and cos signals at the carrier signal frequency $f_c$, these sin and cos signals being produced by a voltage controlled oscillator 84 and a phase shifter 85. The output of the oscillator 84 is kept in phase lock with the incoming signal by means of a phase lock loop. This loop operates on a signal produced by subtracting the detected base stream from the signal fed to the base detector 24 (see FIGS. 4 and 9); the signal produced by this subtraction is a measure of the phase error present due to noise plus the phase error due to imperfect tracking of the received signal by the oscillator 84. In FIG. 13, the generation of this phase error signal by the above-mentioned subtraction process is effected in block 86. By averaging out the noise phase error in a loop filter 88, after having first converted the phase error signal into an analogue voltage via a digital to analogue converter 87, it is possible to derive a signal indicative of phase lock error which can be fed back to the oscillator 84 to reduce this error. As an alternative to the foregoing coherent detection arrangement, it is, of course, possible to use differential PSK to encode the symbol words onto the carrier; in this case, the actual received value of $(\phi+K)$ would correspond to the difference between successive output values of ROM 94 in FIG. 13. Where differential PSK is used, the blocks 86, 87 and 88 are no longer required.

The output of the two mixers 82, 83 are fed via respective analogue to digital converters 89, 90 to respective digital filters 91, 92 the characteristics of which are controlled by a data rate controller 93 to match the characteristics of these filters to those of the filters 63, 64 of the phase modulator. The outputs of the filters 91 and 92 respectively represent, in binary form, the values $\sin(\phi+K)$ and $\cos(\phi+K)$. These binary output signals are fed to respective inputs of a read only memory (ROM) 94 arranged to output a binary signal on bus 95 equal in value to the quantity $(\phi+K)$. The binary signal on bus 95 is then fed to block 80 for processing in the manner already described.

From the foregoing, it is apparent that modems embodying the invention give improved data rate/bandwidth efficiency characteristics as compared with standard PSK systems for the same power levels and error rates. Thus, for example, the described embodiment using two overlays coded with bi-orthogonal codeword of lengths eight and thirty-two respectively, has a data rate/bandwidth efficiency of;

$$2+(b4/8)+6/32=2.6875 \text{ bits per Hz}$$

as compared with two bits/Hz for an equivalent standard QPSK system. The embodiment of the invention using three overlays with codeword lengths of four, sixteen and sixty-four gives a data rate/bandwidth efficiency of 3.17 bits/Hz.

We claim:

1. A method of data communication including transmitting a binary data stream by a process characterised by the steps of:
    dividing the data stream into a first, base bit stream, (14; 40) and at least one second bit stream (15; 41, 42),
    subjecting the said at least one second bit stream (15; 41, 42) to error control coding to produce at least one overlay bit stream (17; 44, 46),
    utilising said base and overlay bit streams to generate a succession of symbol words of binary form, the most significant bit or bits of each symbol word being derived from the base bit stream while the least significant bit or bits are derived from the said overlay bit stream, and
    utilising said symbol words to control the modulation level of a carrier signal during respective time intervals, said modulation level during each said time interval comprising a base modulation level component defined by the most significant bit or bits of the respective symbol word, and an overlaid modulation level component defined by the least significant bit or bits of said respective symbol word and linearly superposed upon said base modulation level component.

2. A method of data communication according to claim 1, further including receiving the transmitted data by a receiving process including the steps of:
    generating a succession of modulation-level binary words representing the level of modulation ($\phi$) of the carrier signal during respective modulation time intervals,
    deriving from the least significant bits of the modulation-level words at least one received overlay bit stream (17; 44, 46) generated during the transmission process,
    effecting error correction on the said at least one received overlay bit stream in accordance with the error control coding implemented in the transmission process,
    subtracting the bits of the said at least one overlay bit stream, after error correction, from the modulation-level words and then utilising the latter to derive a received base bit stream corresponding to the said base bit stream (14; 46) generated during the transmission process,
    utilising the said at least one error-corrected received overlay bit stream to generate at least one received second bit stream corresponding to said at least one second bit stream (15; 41, 42) generated during the transmission process, and
    combining the received base bit stream and the at least one received second bit stream to form a received data stream.

3. A method of data communication according to claim 1, wherein the base bit stream (14; 40) is also subject to error control coding before being utilised, jointly with said at one overlay bit stream (17; 44, 46), to generate said succession of symbol words.

4. A method of data communication according to claim 1, wherein said at least one overlay bit stream (17; 44, 46) is divided into further bit streams at least one of which is suject to further error control coding before being utilised in the generation of said succession of symbol words.

5. A method of data communication according to claim 1, wherein the error control coding to which the said at least one second bit stream (15; 41, 42) is subjected, utilises an orthogonal or bi-orthogonal block code.

6. A method of data communication according to claim 5, wherein said binary data stream is divided into said first, base, stream (40) and two said second streams (41, 42), the second streams (41, 42) being error coded using respective codes whereby to produce respective said overlay bit streams (44, 46) which are then used one bit a time in generation of said succession of symbol words, the codeword length of said codes used in producing each overlay stream (44, 46) being the greater the lesser the significance in each symbol word of the bit contributed by that overlay stream.

7. A method of data communication according to claim 6, wherein the codeword length of the codes used in producing said overlay streams (44, 46) changes by a factor of four between streams providing bits of adjacent significance in said symbol words.

8. Data communication apparatus for transmitting a binary data stream, characterised in that said apparatus comprises:
    data-stream dividing means (8) for dividing the data stream into a first, base bit stream (14; 40) and at least one second bit stream (15; 41, 42),
    error-coding means (18; 43, 45) arranged to subject the said at least one second bit stream (15; 41, 42) to error control coding to produce at least one overlay bit stream (17; 44, 46),
    a signal organiser arranged to receive said base and overlay streams and to generate therefrom a succession of symbol words of binary form, the most significant bit or bits of each symbol word being derived from the base bit stream while the least significant bit or bits are derived from said at least one overlay bit stream, and
    a modulator coupled to the signal organiser and arranged to modulate a carrier signal such that the level of modulation is controlled according to said symbol words during respective modulation time intervals, with said modulation level during each said time interval comprising a base modulation level component defined by the most significant bit or bits of the respective symbol word, and an overlaid modulation component defined by the least significant bit or bits of said respective symbol word and linearly superposed upon said base modulation level component.

9. Data communication apparatus arranged to receive data in the form of a modulated signal having a modulation level representative of a transmitted base bit stream and at least one transmitted overlay bit stream which has been subjected to error control coding, the said transmitted bit streams being derived from an original data stream divided into two or more parts, wherein the apparatus comprises:

demodulator means (20) for generating a succession of modulation level binary words representing the level of modulation of the carrier signal during respective modulation time intervals, overlay detector means (21; 50, 21) for deriving from the least significant bits of the said modulation-level words at least one received overlay bit stream corresponding to the said at least one overlay bit stream (17; 44, 46) generated during the transmission process, the overlay detector means (21; 50, 21) being arranged to effect error correction on the said at least one received overlay bit stream in accordance with the error control coding implemented in the transmission process, overlay subtractor means (23; 52, 23) for removing the bits of the said at least one overlay bit stream, after error correction, from the modulation-level words, base-stream decoder means (24) arranged to utilise said modulation-level words, after subtraction of said overlay stream bits, to derive a received base bit stream corresponding to the said base bit stream (14; 40) generated during the transmission process, overlay decoder means (25; 53, 25) arranged to utilise the said at least one error-corrected received overlay bit stream to generate at least one received second bit stream corresponding to said at least one second bit stream (15; 41, 42) generated during the transmission process, and combining means (19) for combining the received base bit stream and the at least one received second bit stream to form a received data stream.

* * * * *